United States Patent [19]

Orillion

[11] 4,132,221
[45] Jan. 2, 1979

[54] PYRAMIDAL SOLAR HEATING SYSTEM

[76] Inventor: Alfred G. Orillion, 1201-E Cleermont Cir., Huntsville, Ala. 35801

[21] Appl. No.: 800,745

[22] Filed: May 26, 1977

[51] Int. Cl.² ............................................. F24J 3/02
[52] U.S. Cl. ................................. 126/271; 237/1 A
[58] Field of Search ............... 126/271, 270; 237/1 A

[56] References Cited

U.S. PATENT DOCUMENTS

| 2,167,576 | 7/1939 | Kiser | 126/271 |
| 2,213,894 | 9/1940 | Barry | 126/271 |
| 3,006,818 | 10/1961 | Lappala et al. | 126/271 |
| 3,244,186 | 4/1966 | Thomason et al. | 126/270 |
| 3,831,581 | 8/1974 | Baseley | 126/270 |
| 4,010,734 | 3/1977 | Chayet | 126/271 |

*Primary Examiner*—Carroll B. Dority, Jr.
*Attorney, Agent, or Firm*—C. A. Phillips

[57] ABSTRACT

A solar heater in which a water storage tank is positioned within a pyramidal enclosure of which approximately one-half of the side area is light transmissive, and the other side and base area have a reflective inner surface, whereby solar radiation passing through the light transmissive side area in part directly impinges on the tank, and in part is reflected onto the tank.

9 Claims, 6 Drawing Figures

4,132,221

PYRAMIDAL SOLAR HEATING SYSTEM

BACKGROUND OF THE INVENTION

1. Field of the Invention

This invention relates to solar heating systems, and particularly to a new combination of an enclosure and an absorber or collector.

2. General Description of the Prior Art

In the past few years, and even before, many configurations of solar collectors have been proposed and some of them marketed. The principal problem today with solar heat is, as with most products, providing an acceptable balance between cost, effectiveness, and durability. The fact that no single configuration has really captured the market is an indication that optimum designs are yet to appear. Considering the known types, perhaps the most common one is the flat plate collector wherein a dark colored heat receiver is encased within an enclosure having a transparent or translucent face through which solar radiation directly impinges on the receiver and having a bottom side which is heavily insulated. Typically, the receiver contains a passageway or passageways through which a liquid, to be heated, is circulated. Depending upon the material through which the receiver is constructed, and thereby often its durability, a flat plate collector costs in the vicinity of $8.00 to $14.00 per square foot of active surface, with typical installation costs for a domestic hot water heater system running $800.00 to $2,000.00. This high cost is in part because of a typical requirement that there be a liquid-to-liquid heat exchanger to heat potable water and the use of a special fluid which flows between the heat receiver and the heat exchanger in order to avoid corrosion and deposits on the passageways of the heat receiver, which would render the receiver inoperative or ineffective after a relatively short period (in terms of the typical and expected life a heat system or even a hot water system of 5 to 15 years).

In an effort to solve some of the foregoing problems, it has heretofore been proposed that where the object is to heat water, a potable hot water tank itself be encased in a heat receiving enclosure, and that in addition to utilizing direct radiation from the sun, some reflected radiation be captured and furnished to the tank. One such system is illustrated in the September, 1976 issue of "Popular Science" magazine, starting on page 101. This system employs an elongated tank in an enclosure with an elongated front and with two of the sides forming a light transmissive trapezoid. The back side, with a reflective inner surface, is parallel to the front side, and the top and bottom sides are perpendicular to the plane of the other sides and are heavily insulated. A difficulty with this configuration is that for optimum performance, it must be adjusted in attitude for the latitude of the location and as a function of the altitude (varying with seasons) of the sun. Preferably, some azimuth changes should be made through the day, i.e., tracking of the sun, for best solar energy capture.

Considering the foregoing, it is an object of this invention to overcome the stated problems, and particularly to provide a collector which both directly heats potable water, is long-lasting, and is of a configuration which provides a substantial measure of angular compensation, enabling it to be constructed with a fixed orientation, and yet be of improved effectiveness despite significant variations in both azimuth and altitude (seasons and latitude) of the sun.

SUMMARY OF THE INVENTION

In accordance with the invention, the absorber of the solar heater would simply be a conventional water tank, and the enclosure for it would be pyramidal in shape, with approximately half the wall surface of the enclosure being light transmissive, and the other half, on its inner face as well as the inner base, being reflective. Solar radiation would pass through the light transmissive portion of the enclosure and a portion directly strike the tank and the balance significantly reflected onto the tank. This configuration does not require tilting. Its design is such that the base is set in a horizontal plane, and the angle of the sloping sides may be readily adjusted for latitude locations to improve solar collector efficiency. However, without any adjustment for latitude, and with sides permanently set at a fixed angle in the range of 40° to 80°, the system is very efficient. Further, by virtue of the reflective inside base and sloping sides, a very large portion of radiation emitted by the tank, and which might otherwise be lost, is reflected back onto the tank, substantially reducing losses. In fact, by virtue of this configuration, insulation is not really required for the reflective sides. Since the tank is not closely adjacent to the side walls of the structure, typical high stagnation temperatures that may occur with no water in the tank will not produce high hazardous temperatures.

DETAILED DESCRIPTION OF THE DRAWINGS

Figure 1:
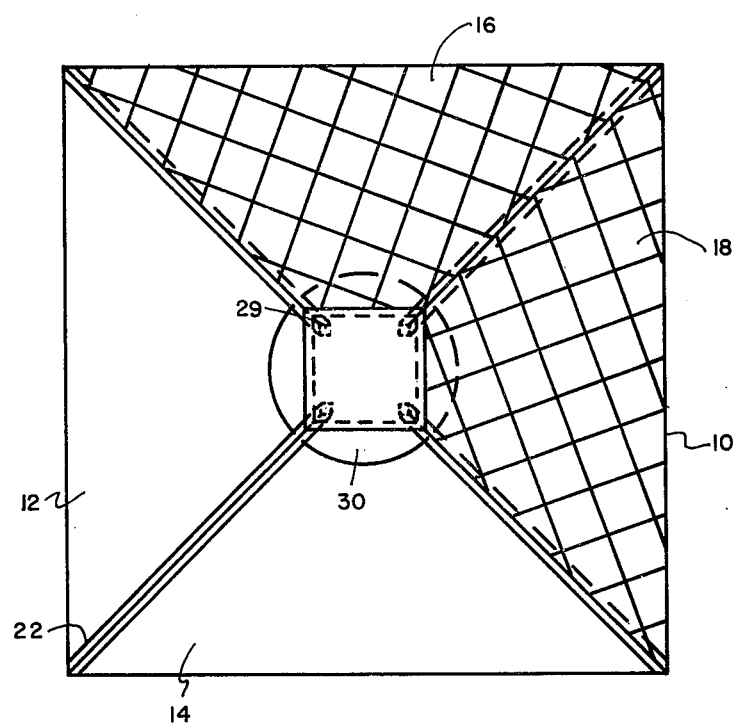
FIG. 1 is a plan view of an embodiment of this invention.
Figure 2:
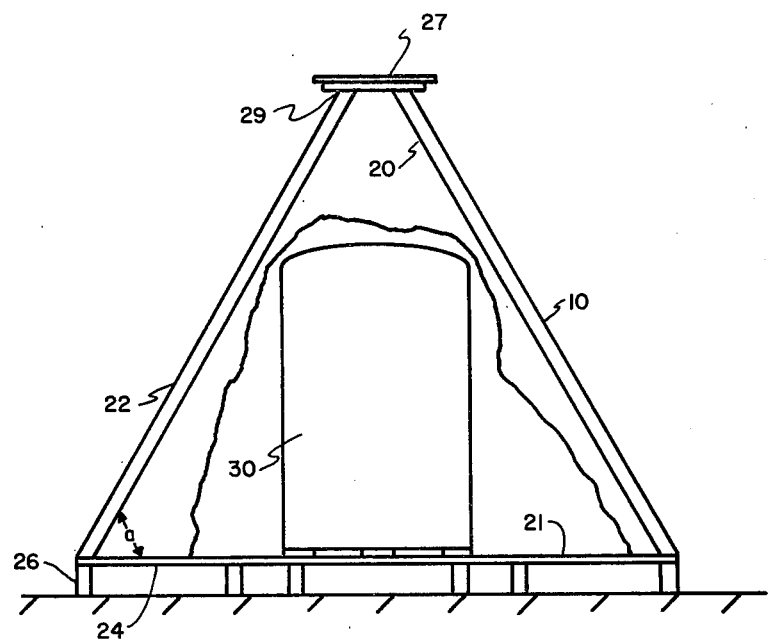
FIG. 2 is an elevation view with a portion of the side wall cut away to illustrate the interior arrangement.

Referring initially to FIGS. 1 and 2, a pyramidal enclosure 10 is constructed wherein triangular panels 12 and 14 are light transmissive, and triangular panels 16 and 18 are opaque and constructed with an interior reflective surface 20. Additionally, the surface 21 of base 24 is reflective. The angle "a" (measured vertically from the horizontal) for the panels would be in the range of 40° to 80°. The panels are supported on frame members 22 which are supported at their bottom by base 24, typically of plywood, this base then being supported by pillows or elongated planks 26. The tops 29 of frame members 22 are connected, by means not shown, to rain cap or plate 27 which additionally functions to generally prevent leakage at the point of connection of the panels at the top. As a typical illustration, the base of each wall panel would be approximately 64 inches, and the height of the unit would be approximately 50 inches with rain cap 27, and 56 inches without rain cap 27. In the center of enclosure 10 is positioned a water tank 30, typically holding approximately 48 gallons, and having a diameter of 20 inches and a height of 32 inches. With this configuration, the tank extends upward a generally maximum amount within the enclosure, that is, to a point where there is small clearance between the top of the tank and closest engagement to side wall panels.

Figure 3:
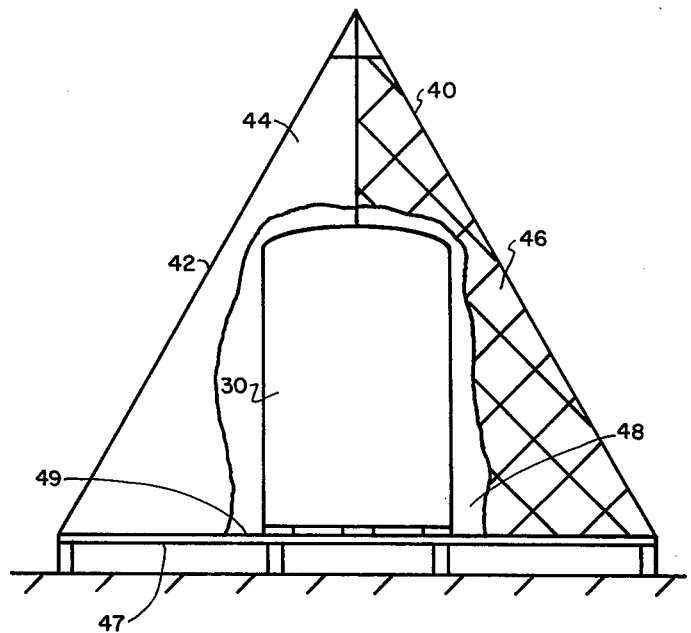
FIG. 3 is an elevation view of an alternate form of this invention wherein the enclosure is conical.

Wall panels of the reflective portion of the enclosure, panels 16 and 18, would typically be constructed of wood, metal, fiberglass, or a plastic material, such as styrofoam, with reflective surfaces 20 and 21 being a reflective coated mylar or of reflective aluminum foil. Light transmission panels 12 and 14 are typically formed of a transparent or translucent plastic material. Top plate 27 may simply be of wood or metal construction and may alternately embody or support a coupla which would have thermostatically controlled vents to enable excess heat in the enclosure to be discharged, if such should occur. Alternately, in order to effect safe operating conditions, a pressure relief valve may be connected to tank 30 which would simply open and discharge any unsafe pressure condition arising from too high a temperature in the enclosure and causing steam to be formed.

Where additional heating capacity is desired, a plurality of solar heaters or collectors of the type shown in FIGS. 1-3 would be employed, with water connections in series, that is, the top or exit connection of one tank would be connected to the entrance or bottom connection of the tank of the next in the series of solar collectors. As a further feature of this invention, particularly where a plurality of collector assemblies are connected in series, there may be added means for the heating and storage of relatively large quantities of water, enabling storage during periods of reduced or no sunlight. By such an enlarged system, there may be provided means for both heating domestic water and means for space heating. For example, in such an arrangement, the temperature of water in tank 30 would be sensed, and when sufficiently elevated, would be pumped between tank 30 and a storage tank, for example, the latter having 300 to 800 gallons. Domestic hot water would then be furnished to an inlet of a standard hot water heater by running a water inlet through a heat exchanger in the water storage tank to thus effect supplemental heating as in the case of the embodiment of the invention shown in FIG. 4. Heat for space heating would be obtained by pumping water from the storage tank through a heat exchanger connected in the heating circuit with a blower system, typically a hot air circulating system already available in the structure to be heated.

FIG. 3 illustrates a conical enclosure 40 wherein one-half of the side walls, the front half 42, as shown, would be formed of a light transmissive material 44, and the other half, the back half 46 being of opaque material, having an inner reflective surface 48. The inside of base 47 would have an inner reflective surface 49. Inside enclosure 40 would be a water tank 30.

Figure 4:
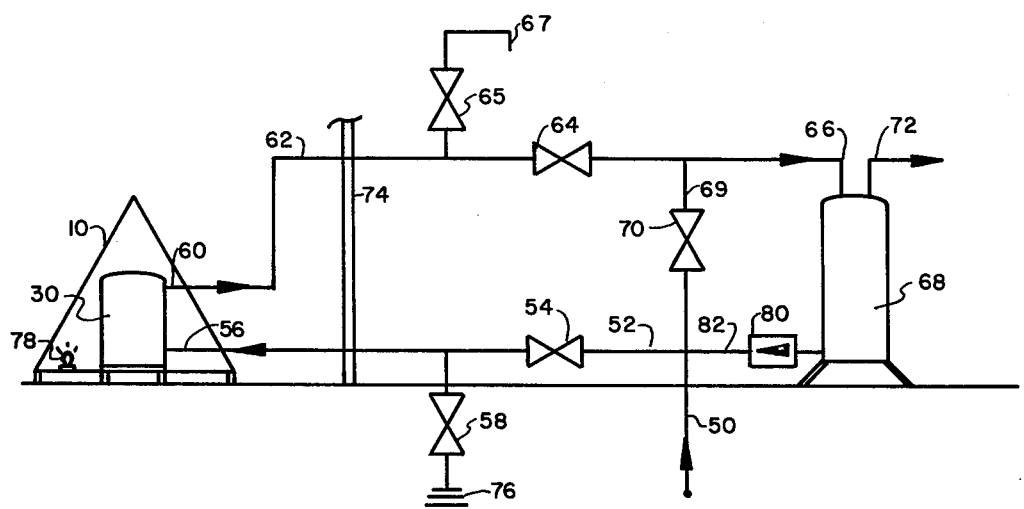
FIG. 4 is a schematic illustration of a complete water heating system as contemplated by this invention.

Referring to FIG. 4, fresh water, typically from a waterline source inlet 50 running to a residence, would be tapped; and a line 52, having a valve 54 in it, is connected from this source inlet to tank inlet 56 at the bottom of tank 30. Between valve 54 and inlet 56 there would be a drain valve 58. An exit 60, typically at the top of tank 30, would be connected through line 62 and valve 64 to inlet 66 of a standard hot water heater 68. There is also connected to line 62 a standard air control valve 65, a valve which will let air in and out of vent 67, but not pass water out. Additionally, there is a line 69 with a valve 70 directly interconnecting the water source inlet 50 and inlet 66 of hot water heater 68. An exit line 72 connects from hot water heat 68 to points of usage (not shown).

Valves 54, 64, 58, and 70 may be either manually or automatically operated. For example, typically, valves 54 and 64 would be thermostatically closed and valve 70 thermostatically opened whenever the temperature in tank 30 drops below the temperature of the water from source inlet 50. When this occurs, water flow would be blocked into tank 30 and would be directly furnished to hot water heater 68. When temperature drops to a value at which freezing is likely to occur, valve 58 would typically be thermostatically operated to drain tank 30, air being admitted to tank 30 through air valve 65. Typically, these valves and hot water tank 68 would be inside a building, as suggested by building wall 74, with an appropriate drain line extending outside the building from valve 58 which would typically drain into a sump in ground 76. If desired, a light bulb 78 or other heating element may be employed within enclosure 10 to provide heat in the enclosure sufficient to prevent freezing of water in tank 30 (or reducing the likelihood of freezing).

Where water heater 68 is located above tank 30, a circulation of water between the tank and water heater may be effected by thermal pumping, it only being necessary to connect a check valve 80 in a line 82 between the bottom of water heater 68 (as by connection to the bottom drain of the heater) and line 52. Thus, by convection, solar heated water would rise out of tank 30, flow through line 62, and exit into water heater 68, with the cooler water in the bottom portion of water heater 68 returning to tank 30 via lines 82 and 52 and through check valve 80, and thus be circulated. Check valve 80, of course, would prevent a back flow into the bottom of the water heater. By this system, losses in hot water heater 68 may be continuously made up and stored by heated water from tank 30 so long as sufficient sunlight were present.

Figure 6:
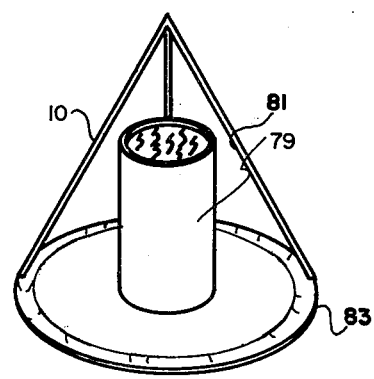
FIG. 6 is a diagrammatic illustration of an embodiment of the invention used for distillation.

While the system thus far described is indicated for the purpose of heating water, it is to be appreciated that tank 30 may be a cavity through which air is moved and heated or a heat sink material such as sand or rocks placed in the container to accept and store heat for use in some other structure coupled by air ducts to tank 30. It is to be further appreciated that the embodiment of this invention may be scaled upward or downward, for example, a camping or portable model might typically have an enclosure with a two-feet square floor surface, the enclosure being 20 inches high, and the tank having a five-gallon capacity and simply being made in the form of a plastic bag. As still a further application of the present invention, it may be employed as a fresh water generator. In this application, as illustrated in FIG. 6, the top of collector tank 79 would be opened to within enclosure 10 and brackish or salt water pumped or poured into the tank (below the level of the opening). In either case, it is to be appreciated that any typical opening in the top of the tank, such as by a connecting pipe, will suffice. Solar heat would cause the water in the tank to be evaporated, and the evaporated water would condense on the inside wall 81 of enclosure 10, running down the wall to collector channels 83 extending around and attached to the inner side of the walls.

Figure 5:
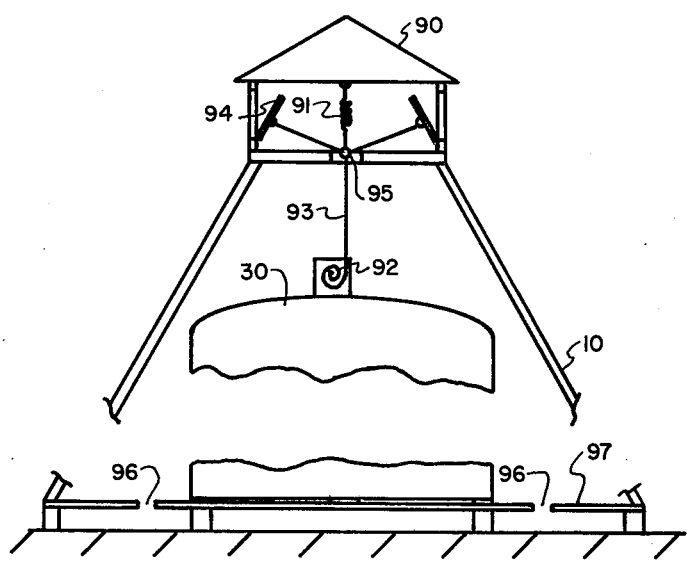
FIG. 5 is a diagrammatic illustration of a system for automatic introduction of cooling air into an enclosure to prevent overheating.

As described, the present invention particularly enables the implementation of a drain-down type of system which clearly offers advantages over systems which use a discrete and separate liquid flow between the collector and storage tank. Thus, drain-down systems allow the use of potable water as the heat transfer liquid and thereby eliminating the need for a discrete heat exchanger. The massive tank-type collector used with the present invention is not detrimentally effected by high temperatures which can be experienced with summer solar incidences. Here a substantial balance is achieved between the energy reflected and collected in the collector tank and that radiated and reflected away from the collector tank. Second, a residual amount of water (a few gallons) always remains in the bottom of the collector tank when flow is turned off. This water would absorb energy through heat evaporazation, and the vapor may be exhausted out through a vent or typically a pressure release of the type typically provided on hot water tanks. Third, an optional convention control coupla may be installed on the top of the housing of the system, and by means of a bi-metal temperature sensor, doors or slots on the coupla may be opened when the temperature inside the housing reaches some selected temperature, e.g., 300° F., which would be well within the design temperatures of the tank. Such a coupla, coupla 90, is shown in FIG. 5. It employs two hinged doors 94 normally biases shut by spring 91. When the temperature in tank 30 rises above a selected temperature, bi-metallic temperature sensor 92 pulls on linkage 93, to which spring 91 and doors 94 are connected by ring 95, causing the doors to open. This allows cooling air to circulate by natural convention currents from opened slots 96 in base 97 throughout enclosure 10 to thus lower temperature below a selected level, at which point bi-metallic sensor 92 releases tension on spring 91, enabling doors 94 to close and stopping air circulation.

No pressurization of the system is needed beyond that supplied by the source, e.g., a municipal water supply. Where used, storage tanks would be insulated and large enough to contain water from the collector tank and plumbing lines. Further, where pumping is employed between a collector tank and a storage tank, the pump need only a small capacity, sufficient to provide only the needed head for flow. Any residual water left in a collector tank during winter (and when not used) would not cause a burst from freezing since there would be ample room within the tank for expansion. Thermal shock, as when introducing water into the collector tank, would not be a problem because of the mass of the collector tank, and stresses would be low as it is typically only lightly pressurized.

Having thus described my invention, what is claimed is:

1. A solar heater comprising:
    a pyramidal enclosure;
    the wall of the enclosure, extending approximately one-half way around the enclosure, and a base of the enclosure having a reflective coating on inner sides, and approximately the balance of the wall surface of the enclosure being light transmissive; and
    a tank positioned on and rising from the central region of the base of said enclosure;
    whereby a significant amount of solar radiation passing through said light transmissive wall surface would directly strike the tank, and a significant amount of radiation would also initially strike the inner reflective surfaces of the enclosure and be reflected onto the tank, and by this combination, any material in the tank quite effectively heated.

2. A solar heater as set forth in claim 1 wherein said tank has an open top portion.

3. A solar heater as set forth in claim 1 further comprising temperature responsive means for opening a portion of said enclosure upon the occurrence of a temperature above a selected temperature.

4. A solar heater as set forth in claim 1 further comprising electrical heating means within said enclosure for providing heat within said enclosure.

5. A solar heater as set forth in claim 1 wherein the sides of the pyramidal enclosure are formed of flat and triangular-shaped surfaces.

6. A solar heater as set forth in claim 1 wherein said enclosure conical in configuration.

7. A solar heater as set forth in claim 1 wherein a fluid inlet is connected to a lower region of the interior of said tank, and a fluid exit is connected to an upper interior region of said tank.

8. A solar heater as set forth in claim 7 further comprising a first valve, an on-off valve, in circuit between a fluid source and said inlet of said tank; and a second valve, a drain valve, is connected in circuit between said first-named valve and said fluid inlet of said tank.

9. A solar heater as set forth in claim 8 further comprising:
    an auxiliary fluid heater having an inlet connected to the exit of said tank and having an outlet connected to said inlet of said tank;
    a by-pass valve connected in a circuit between said source of fluid and said inlet of said auxiliary fluid heater, whereby fluid may be directly supplied to said auxiliary fluid heater rather than being supplied through said tank;
    a valve connected between the exit of said tank and said inlet of said auxiliary fluid heater; and
    air valve means connected to the exit of said tank for enabling air to enter said tank and thereby to enable the tank to be drained.

* * * * *